SAMUEL F. HUTCHINS

Oct. 13, 1970   S. F. HUTCHINS   3,534,384
RADIATION DISTRIBUTION TABULATION RECORDER
Filed Dec. 24, 1968   6 Sheets-Sheet 4

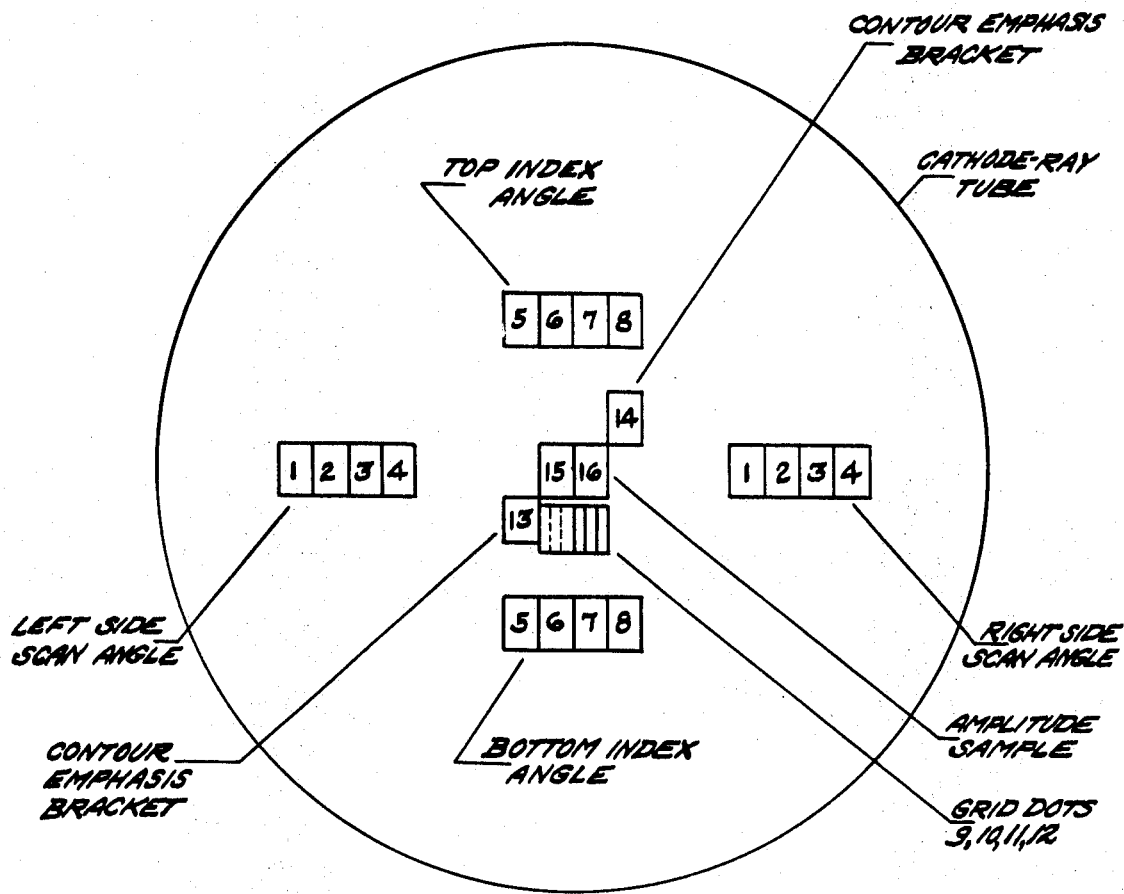

Oct. 13, 1970     S. F. HUTCHINS     3,534,384

RADIATION DISTRIBUTION TABULATION RECORDER

Filed Dec. 24, 1968     6 Sheets-Sheet 6

United States Patent Office 3,534,384
Patented Oct. 13, 1970

3,534,384
RADIATION DISTRIBUTION TABULATION
RECORDER
Samuel F. Hutchins, Atlanta, Ga., assignor to the United
States of America as represented by the Secretary of
the Air Force
Filed Dec. 24, 1968, Ser. No. 786,581
Int. Cl. G01d 9/38; G01r 13/14
U.S. Cl. 346—110                           5 Claims

ABSTRACT OF THE DISCLOSURE

An apparatus for photographically recording numeric characters representing an antenna radiation distribution pattern written on the face of a cathode-ray tube. The film, mounted on a digitally controlled transport, records the numeric characters by alternately projecting 2-digit numbers and stepping in the X direction an increment corresponding to each angular increment of rotation of the antenna in azimuth. Upon completion of each azimuth scan, the lens is stepped one increment in the Y (elevation) direction by a second stepper motor. Movement of the lens moves the image of the characters on the film so that each succesive scan line is imaged just below the preceding line.

BACKGROUND OF THE INVENTION

This invention relates to a system for high-speed recording of alpha-numeric characters on photosensitive material, and, more particularly, the invention is concerned with providing a system for high-speed, numerical recording of relative signal levels in decibels versus $\theta$- and $\phi$-orientation angles of a spherical coordinate system to provide a quasi-contour presentation of a radiation distribution pattern.

Heretofore, prior to the development of automatic recording equipment, a three-dimensional antenna pattern was described by manually preparing a contour plot through point-by-point transfer from a complete family of patterns in rectangular or polar coordinate form. Isolines were drawn to show lines of constant antenna gain. Manual preparation of such a plot is laborious and time consuming.

A contour plotter, which is now obsolete, was developed for automatic preparation of an antenna contour plot. In this system the antenna under test was programmed to scan through a solid angle of interest while simultaneously a recorder marked by dots and dashes the locations on a chart for which the signal strength crossed selectable fixed increments. The contour plot was completed by drawing lines to connect points at equal power levels and in a manner that produced closed, non-intersecting contour lines.

Other contour plotters operate in a manner similar to that described above except that a print wheel is employed to stamp numerals on the chart for identification of contour levels. A radiation distribution table can be prepared by this instrument by printing numerals at equally spaced angular increments.

The presently known devices listed above are limited in speed of recording, accuracy, and flexibility of format. The signal input to the radiation distribution printer is obtained from a digital encoder coupled to the logarithmic balance potentiometer of a conventional antenna pattern recorder. The accuracy and speed of response of the radiation distribution printer is limited by the associated antenna pattern recorder. The performance of the mechanical servo cannot be improved sufficiently for this method of recording to give the accuracy and high data rate desired. Also, since the output device of the radiation distribution printer is an electric typewriter and the contour plotters now available employ a mechanical print wheel, the limitations in printing rate and flexibility are rendered incompatible with the objectives of a high-speed, high-accuracy radiation distribution recording system.

SUMMARY OF THE INVENTION

The present invention provides a system wherein numeric characters are written on the face of a cathode-ray tube and imaged onto photographic film or paper. The film is mounted on a digitally controlled transport. Numbers are written across the film by alternately projecting 2-digit numbers onto the film and stepping the film in the X (azimuth coordinate) direction by rotation of a scan stepper drum. The film is advanced an increment in the X direction by a stepping motor for each angular increment of rotation of the antenna in azimuth. Upon completion of each azimuth scan, the lens is stepped one increment in the Y (elevation) direction by a second stepper motor. Movement of the lens moves the image of the characters which are projected on the film so that each successive scan line is imaged just below the preceding line. A viewer may be employed to observe the film recording.

Accordingly, it is an object of the invention to provide a radiation distribution tabulation recorder wherein the distribution data is recorded at a much higher rate than is possible with other presently known methods and equipment.

Another object of the invention is to provide radiation pattern recording equipment wherein the resolution of the recorded distribution tabulation is significantly increased so that the details of the antenna radiation pattern may be clearly distinguished by the user of the equipment.

Still another object of the invention is to provide a recording system wherein the use of a scan stepper drum in the recorder permits the use of continuous film strips so that the loading of new film can be accomplished automatically.

A further object of the invention is to provide an antenna radiation pattern recording system wherein the generation of the raster scan on the film by moving the film in one direction by movement of the drum and by movement of the lens at right angles to the film motion. This procedure provides a more simple and accurate mechanism than one in which the film moves in two directions.

A still further object of the invention is to provide a photographic recording system which utilizes two 45-degree mirrors and fixed baffles to keep stray light out of the cathode-ray tube from fogging the film.

These and other objects, features and advantages will become more apparent after considering the description that follows taken in conjunction with the attached drawings and appended claims.

DESCRIPTION OF THE DRAWINGS

FIG. 5 shows the character positions on the face of the cathode-ray tube;

PREFERRED EMBODIMENT OF THE INVENTION

Although the utilization of the present invention is directed toward its use as a high-speed radiation tabulation recorder, it should be understood that effective use of the invention can be made in other related and non-related applications. The system according to the invention is particularly useful as a substitute for electric typewriters and mechanical print wheels which limit the speed and accuracy of presently known recording systems.

Figure 1:
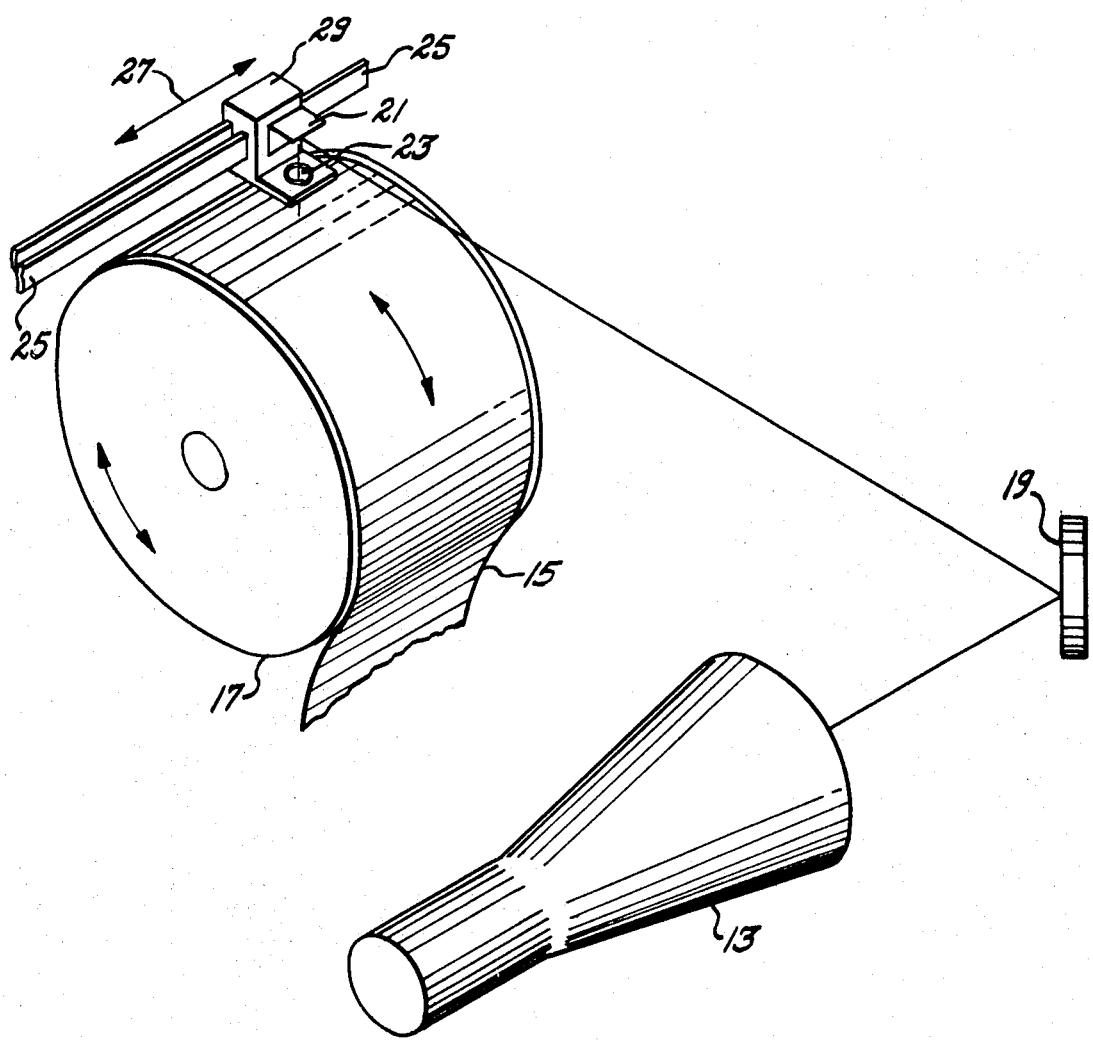
FIG. 1 is a general view in isometric of the radiation distribution tabulation recorder according to the invention.

In the herein-described system, a series of numeric characters are written on the face of cathode-ray tube 13 and imaged onto photographic film or paper 15 as shown in FIG. 1. The film 15 is mounted on a digitally controlled transport or scan stepper drum 17. A mirror 19 mounted at a 45-degree angle to the face of the cathode-ray tube 13 directs the image toward another mirror or prism 21 which in turn redirects the image through the lens 23 onto the photographic film 15. The lens 23 and prism 21 are slidably mounted as a unit on the guide bar 25 for movement laterally therealong in the direction shown by the arrow 27.

Figure 2:
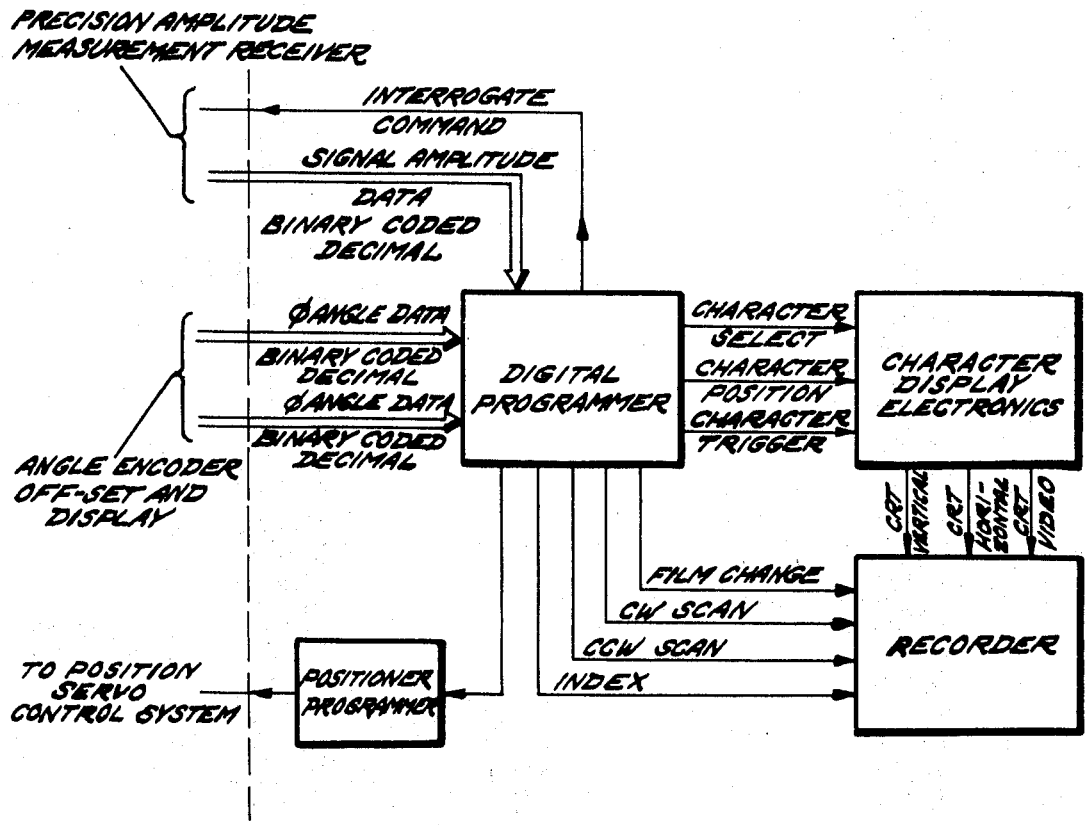
FIG. 2 is a simplified block diagram of the high-speed recording system.
Figure 3:
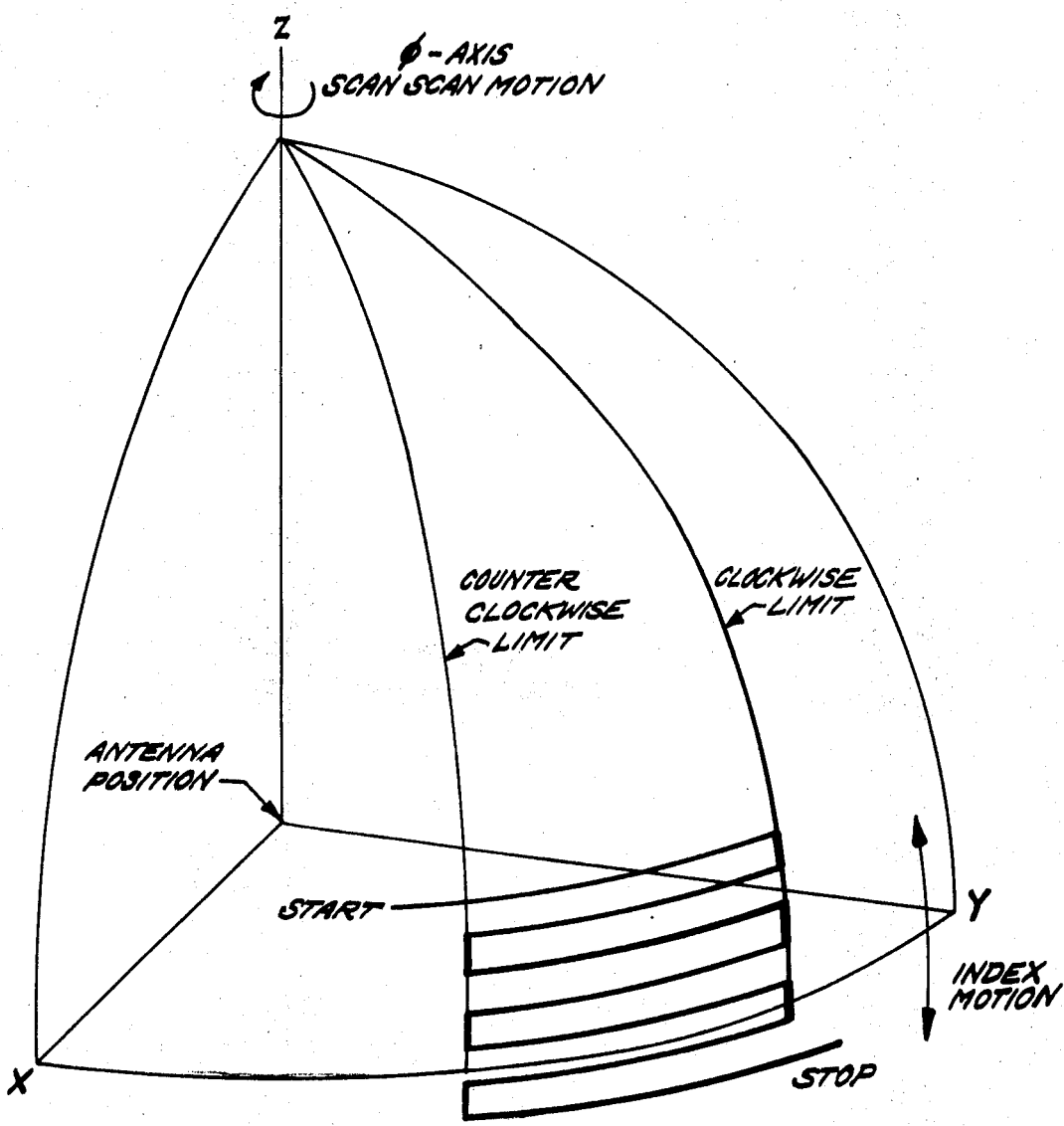
FIG. 3 is an illustration of the raster scan pattern of the antenna which is being recorded to determine the radiation distribution pattern.

A simplified block diagram of the system according to the invention is shown in FIG. 2 and described hereinbelow. The radiation distribution tabulation which is recorded on strip film will contain a variable number of data entries up to a maximum of 72,000 corresponding to 200 lines of 360 samples each. Generation of the radiation distribution tabulation requires the coordinated movement of the antenna under test in a raster scan pattern similar to the one illustrated in FIG. 3.

During the first scan, which will be $\phi$-axis clockwise rotation for the case illustrated, received signal amplitude samples are sequentially recorded to generate the first horizontal line of the radiation distribution tabulation. When the first scan is completed movement of the positioner index ($\theta$) axis changes the orientation of the antenna relative to the transmitter to position the antenna for the second scan. Rotation of the scan ($\phi$) axis in the counterclockwise direction produces the second horizontal line of samples for the tabulation. Continued raster scanning of the antenna relative to a fixed signal source while the received antenna signal is monitored by a receiver supplies the data for generating the radiation distribution tabulation line by line.

During a recording run, scan angle data and index angle data in the form of binary coded decimal are being continuously fed into the programmer (FIG. 2). At the positioner angle (counterclockwise limit) which has been selected by the operator and set into the system, the programmer electronically senses coincidence of the positioner's scan angle with the counterclockwise limit angle and sends an interrogation pulse to the amplitude receiver. The receiver then performs a measurement of the received signal amplitude and sends the amplitude sample in decibels (binary coded decimal) back to the programmer for recording.

The programmer sends binary coded signals to the character display electronics to select the character to be displayed. An analog signal is also sent to position the character at the desired location on the cathode-ray tube (CRT). The characters must be positioned at several locations on the face of the CRT depending on whether the character is to be a numeral in an angle reference, the first or second character of an amplitude sample, the dot for grid line construction, or a contour emphasis bracket. After the reaction of the circuits which determine the character selection and character location a character trigger from the programmer commands the start of character fomation on the CRT. Vertical and horizontal deflection voltages and video information from the character display electronics is supplied to the CRT in the recorder. Characters are generated on the CRT by a raster scan combined with blanking and unblanking of the electron beam similar to the picture generation of a conventional television picture tube.

Figure 4:
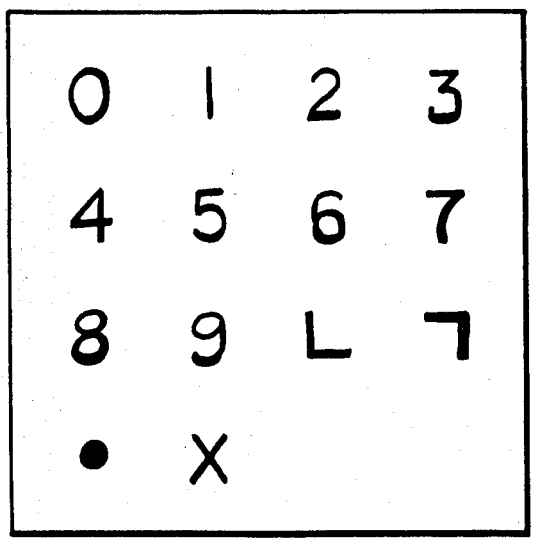
FIG. 4 shows thirteen possible characters in up to 16 positions on the face of the cathode-ray tube.

Thirteen possible characters in up to 16 positions on the face of the CRT are utilized in the recording of each sample. FIG. 4 shows the thirteen characters which are arabic numerals 0 through 9 for amplitude samples and angle references, the letter X to denote missed samples, a dot to generate grid lines and two bracket symbols to generate contour emphasis. The individual characters are displayed and photographed one at a time. At each sample the programmer logic circuits select the position for the next character and select the character to be recorded. The character positions on the face of the CRT display are shown in FIG. 5. Each block represents the area where the electron beam will raster scan to generate a character. The numerals in the block shows the order that the positions are displayed in the recording sequence.

The positions shown at sequence 1 through 4 (FIG. 5) are the numerals for the scan angle reference. They are recorded on the left (or right) border of the radiation distribution tabulation at each tenth scan line. Only the characters 0 through 9 are displayed in positions 1 through 4. The positions shown as sequence 5 through 8 are utilized to record the index angle reference which are at the top and bottom edges of the radiation distribution tabulation at every tenth sample. The positions shown at sequence 9, 10, 11 and 12 are used for generation of the grid lines. Only the dot is recorded at these positions. The positions shown at sequence 13 and 14 are utilized to provide contour emphasis to a sample. Only the bracket symbols are recorded at these positions.

Positions 15 and 16 are the location of the two numerals for the amplitude value. Numerals 0 through 9 will be at each location except during the special case of a missed sample when X's will be recorded. Each character throughout the sequence is displayed on the CRT for 320 microseconds. The time required for the complete sequence is 4.2 milliseconds.

After the first sample is completed the programmer provides a scan command to the recorder which moves the film strip 15 horizontally 0.015 inch. The system then waits for the antenna to move far enough for the programmer to sense that position angle at which another sample is required. Subsequent samples are placed side by side on the film to form the first line of the tabulated data.

When the programmer senses the limit which signifies that the last sample of the scan has been received an index command is sent to the recorder to move the camera lens 0.015 inch below its previous position so that the samples of the second line will be imaged on the film below the first line.

The recorder has a light-tight housing (not shown) which supports and encloses the film drive mechanism, the lens 23 and mirrors 19 and 21, and the CRT 13 which displays the characters to form the radiation distribution tabulation.

Figure 6:
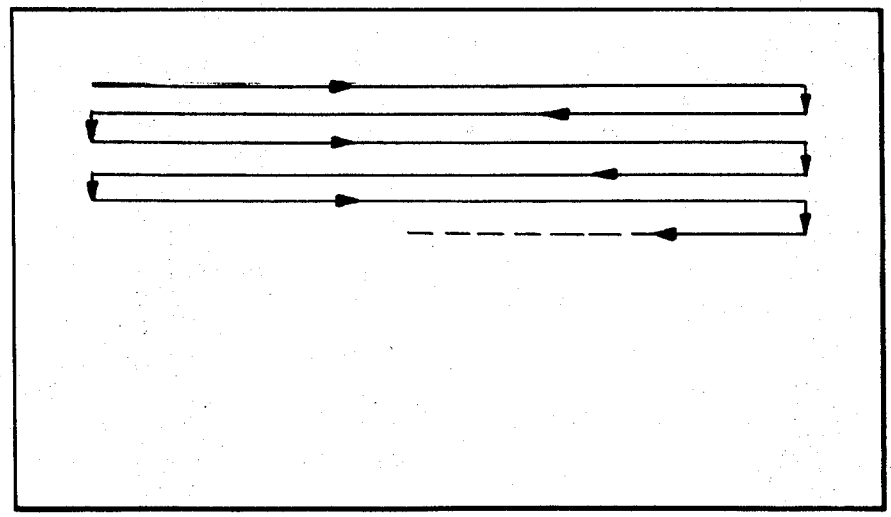
FIG. 6 illustrates the generation of the radiation distribution tabulation on the film which is accomplished by a raster scan pattern of successive horizontal lines.

The generation of the radiation distribution tabulation on the film is accomplished by a raster scan pattern of successive horizontal lines as illustrated by FIG. 6. Each horizontal line is composed of amplitude samples successively imaged on the film side by said from left to right on the first and all odd lines and from right to left on the second and all even lines. The horizontal displacement of successive data groups is accomplished by incremental movement of the film 15 relative to the lens 23 after each sample is exposed. Incremental horizontal steps are provided by movement of the film 15 with the scan stepper drum 17 which is geared to a high-speed, precision stepping motor (not shown). A 1.8 degree incremental movement of the motor shaft moves the rim of the drum 0.015 inch.

Motion of the motor and scan stepper drum 17 is viscous damped to reduce over-shoot at the end of each incremental step. The damper device (not shown) consists of a shaft mounted phenolic disk interconnected between the stepper motor and the pinion gear driving the scan drum. The disk rotates between two stationary plates. The 0.005 inch gap between the moving disk and the stationary plate is filled with silicone grease to provide the viscous damping.

Indexing from one horizontal scan line to the next line is accomplished by incremental movement of the lens 23 in a direction perpendicular to the direction of motion provided by rotation of the drum 17. The motion of the scan stepper drum 17 and the indexing of the lens 23 is illustrated in FIG. 1. A slide bar and carriage 25 supports the lens while a rack and pinion drive mechanism converts the incremental motion from another type stepper motor to the required incremental index motion. The slide bar and carriage 25 that supports the lens 23 and mirror 21 is shown in detail in FIG. 1.

During a recording run the film is held on the scan stepper drum 17 by a vacuum hold-down system. The required differential pressure is supplied by a conventional rotary vacuum pump which exhausts the air from a 4 x 6 x ½ inch chamber under the rim of the scan stepper drum 17. The exhaust chamber is directly under the area of the film which will be exposed under the lens 23 to become the radiation distribution tabulation. Several rows of small holes in the drum surface permits the low pressure pad area to reduce the pressure under the film relative to standard atmospheric pressure which is above the film. The resulting pressure difference holds the film firmly in place on the drum 17 assuring constant focus distance and preventing film slippage that would cause discontinuities in the raster scan pattern.

Light from the face of the CRT 13 impinges on the film only after passing through the lens 23 so that it will form a proper image. Stray light that would fog the film is screened by a system of baffles positioned between the mirrors 19 and 21. FIG. 1 shows the position of the CRT 13 and the 45-degree mirror assembly 19 that turns the light from the CRT 13 toward the lens system 21 that is above the stepper drum 17. The small 45-degree mirror 21 above the lens 23 is slightly larger than the lens 23 but smaller than the bracket that supports the lens 23. All the downward reflected light is shielded from the film 15 except that which enters the lens 23. The lens 23 and the small 45-degree mirror 21 are mounted on the same L-bracket 29 so that lateral movement of the assembly across the film moves the mirror 21 and lens 23 in unison. The baffles (not shown) has a four-inch long opening to provide a line of sight view between the small 45-degree mirror 21 and the large 45-degree mirror 19 at any position of the lens assembly.

Figure 7:
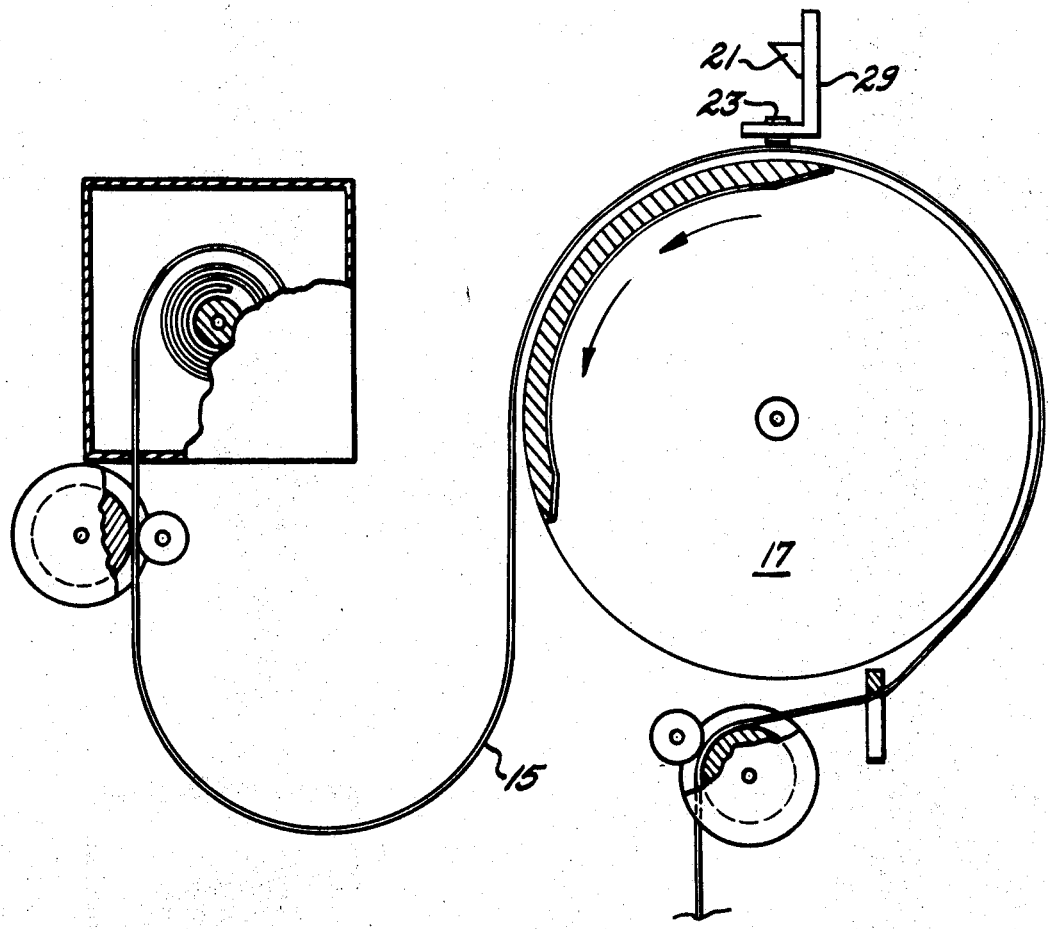
FIG. 7 shows the film advance drum after the completion of a recording run and returned to the counterclockwise position.

The film sequence is illustrated by FIG. 6. After the completion of a recording run the first motion in the film advance sequence is rotation of the scan drum 17 to the counterclockwise position shown in FIG. 7. The vacuum pump is then shut off and a 3-second pause is provided to allow the pressure to equalize in the vacuum hold-down pad to release the film 15. After the pause for vacuum bleed-off, the film-out-spool starts and runs long enough to pull a 20-inch length of film 15 off the scan drum 17. The film 15 is forced into the exposed film canister.

During the same period and for a short time afterward that the film-out-spool is running, the film-in drive is also energized. The film-in circuit is additioinally energized through a phototransistor limit-light system which provides for running of the film-in-spool until the first film loop is large enough.

After the above sequence the vacuum motor is again turned on to lock the film 15 to the scan stepper drum 17. A delay of about 3-seconds is again provided to allow time for the pressure difference to be established. The scan stepper drum 17 is then rotated to a clockwise position where the film loop is on the right side.

Although the invention has been illustrated in the accompanying drawings and described in the foregoing specification in terms of a preferred embodiment thereof, the invention is not limited to this embodiment or to the particular configurations mentioned. It will be apparent to those skilled in the art that my invention can be used for the recording of other types of data and for displaying raster scan motion patterns other than the one disclosed and illustratively shown herein. Also, it should be understood that various changes, alterations, modifications, and substitutions, particularly with respect to the construction details, can be made in the arrangement of the several elements without departing from the true spirit and scope of the appended claims. For example, a number of alternate construction methods could be utilized and still retain the basic concept of moving the film in one direction and moving the lens in a perpendicular direction.

Having thus described my invention what I claim and desire to secure by Letters Patent of the United States is:

1. Apparatus for photographically recording numeric characters representing an antenna radiation pattern, said apparatus comprising a cathode-ray tube, means for measuring a signal received by said antenna, means for displaying on the end of said cathode-ray tube numeric characters indicating the strength of said received signal, a first reflecting surface oriented at a 45-degree angle to the face of said cathode-ray tube for receiving and reflecting a numeric image therefrom, a second reflecting surface positioned to receive and reflect the image reflected from said first reflecting surface and reflect it downward, a lens positioned to receive and enhance the reflected image from said second reflecting surface, said second reflecting surface and said lens being mounted on a common bracket for lateral movement as a unit, a light sensitive sheet material spaced beneath said lens for receiving and recording the image displayed on said cathode-ray tube, a step scanner drum for holding and moving said light sensitive material, means responsive to the position of said antenna for moving said drum in a first direction a predetermined distance corresponding to each angular increment of rotation of the antenna about a first axis, and means responsive to the position of said antenna for moving said common bracket a predetermined distance in a second direction transverse to said first direction corresponding to each angular increment of rotation of said antenna about a second axis.

2. The apparatus defined in claim 1 wherein said first reflecting surface is a plane mirror.

3. The apparatus defined in claim 1 wherein said second reflecting surface is a prism.

4. The apparatus defined in claim 1 wherein said light sensitive sheet material is photographic film.

5. The apparatus defined in claim 1 wherein said light sensitive sheet material is photographic paper.

References Cited

UNITED STATES PATENTS

| | | | |
|---|---|---|---|
| 2,701,876 | 2/1955 | Mottley et al. | 343—100 |
| 3,032,755 | 5/1962 | Snyder | 346—110 X |

JOSEPH W. HARTARY, Primary Examiner

U.S. Cl. X.R.

343—100; 346—33